United States Patent [19]
Nakamura et al.

[11] Patent Number: 6,026,279
[45] Date of Patent: Feb. 15, 2000

[54] METHOD AND APPARATUS FOR SIGNAL TRANSMISSION IN CDMA MOBILE COMMUNICATION SYSTEM

[75] Inventors: Takehiro Nakamura, Yokosuka; Seizo Onoe; Kouji Ohno, both of Yokohama, all of Japan

[73] Assignee: NTT Mobile Communications Networks, Inc., Tokyo, Japan

[21] Appl. No.: 08/873,738

[22] Filed: Jun. 12, 1997

[30] Foreign Application Priority Data

Jun. 14, 1996 [JP] Japan ................................. 8-154469

[51] Int. Cl.[7] ........................................ H04Q 7/20
[52] U.S. Cl. ................................................. 455/69
[58] Field of Search ............................ 455/447, 466, 455/511, 515, 522, 68, 69, 70, 71, 502, 574, 63, 125, 126, 13.4; 370/335, 342, 515, 433, 479, 435, 437, 203, 468, 355, 253, 252; 375/222, 206, 208, 225

[56] References Cited

U.S. PATENT DOCUMENTS

5,056,109  10/1991  Gilhousen et al. .
5,295,152   3/1994  Gudmundson et al. ................ 370/342
5,396,515   3/1995  Padovani et al. .......................... 455/69
5,526,383   6/1996  Takenaka et al. ....................... 455/502
5,574,983  11/1996  Douzono et al. ........................ 455/524
5,590,409  12/1996  Sawahashi et al. ....................... 455/69
5,673,260   9/1997  Umeda et al. ........................... 370/342
5,832,368  11/1998  Nakanot et al. ........................ 370/335

*Primary Examiner*—Dwayne D. Bost
*Assistant Examiner*—Jean A. Gelin
*Attorney, Agent, or Firm*—Oblon, Spivak, McClelland, Maier & Neustadt, P.C.

[57] ABSTRACT

A method and an apparatus for signal transmission in a CDMA mobile communication system which are capable of preventing an unnecessary increase of an amount of interference power due to the signal transmission through a radio channel and thereby preventing an unnecessary decrease of a system capacity. The radio channel transmission signals are transmitted through the radio channel, where the radio channel transmission signals contain the transmission signals which are formed by control signals or user signals and necessary signals which are necessary in maintaining the radio channel, and this radio channel transmission is controlled so that only signal portions for the necessary signals are transmitted without transmitting any other signal portions when there is no transmission signal to be transmitted.

24 Claims, 8 Drawing Sheets

METHOD AND APPARATUS FOR SIGNAL TRANSMISSION IN CDMA MOBILE COMMUNICATION SYSTEM

BACKGROUND OF THE INVENTION

1. Field of the Invention

The present invention relates to a method and an apparatus for signal transmission in a CDMA (Code Division Multiple Access) mobile communication system in which base stations and a mobile station carry out communications according to the CDMA scheme by transmitting transmission signals which are formed by control signals or user signals through a radio channel set up between each base station and a mobile station.

2. Description of the Background Art

Here, a conventional signal transmission method for a mobile communication system will be described by taking an example of a radio channel set up before the start of a communication between a base station and a mobile station in a digital mobile communication system called GSM which is currently used for the mobile communication service mainly in Europe.

In the GSM, a plurality of transmission signals are transmitted between a mobile station and a base station through a radio channel which is set up between the mobile station and the base station before the start of a communication. The transmission signal processing time required at each of the base station and the mobile station reaches as much as several hundred msec., and no transmission signals are transmitted on the radio channel during that processing time. However, in the conventional mobile communication system (GSM), the radio channel has been always continuously transmitted regardless of the presence or absence of transmission signals to be transmitted.

Now, in the CDMA mobile communication system, the system capacity is determined by an amount of interference power, and the system capacity decreases as an amount of interference power increases. In order to prevent an increase of an amount of interference power, there is a need to eliminate wasteful radio channel transmission.

However, even in the conventional CDMA mobile communication system, when the transmission signals are to be transmitted through the radio channel between a base station and a mobile station, the radio channel has been always continuously transmitted regardless of the presence or absence of transmission signals to be transmitted, so that an amount of interference power has been increased unnecessarily and the system capacity has been decreased unnecessarily.

SUMMARY OF THE INVENTION

It is therefore an object of the present invention to provide a method and an apparatus for signal transmission in a CDMA mobile communication system which are capable of preventing an unnecessary increase of an amount of interference power due to the signal transmission through a radio channel and thereby preventing an unnecessary decrease of a system capacity.

According to one aspect of the present invention there is provided a method of signal transmission at a base station or a mobile station in a CDMA mobile communication system in which the base station and the mobile station carry out communications according to a CDMA scheme by transmitting transmission signals which are formed by control signals or user signals through a radio channel set up between the mobile station and the base station, the method comprising the steps of: transmitting radio channel transmission signals through the radio channel, the radio channel transmission signals containing the transmission signals and necessary signals which are necessary in maintaining the radio channel; and controlling the transmitting step so that only signal portions for the necessary signals are transmitted without transmitting any other signal portions when there is no transmission signal to be transmitted.

According to another aspect of the present invention there is provided an apparatus for signal transmission at a base station or a mobile station in a CDMA mobile communication system in which the base station and the mobile station carry out communications according to a CDMA scheme by transmitting transmission signals which are formed by control signals or user signals through a radio channel set up between the mobile station and the base station, the apparatus comprising: a transmission unit for transmitting radio channel transmission signals through the radio channel, the radio channel transmission signals containing the transmission signals and necessary signals which are necessary in maintaining the radio channel; and a control unit for controlling a radio channel transmission by the transmission unit so that only signal portions for the necessary signals are transmitted without transmitting any other signal portions when there is no transmission signal to be transmitted.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 8, various embodiments of a method and an apparatus for signal transmission in a CDMA mobile communication system according to the present invention will be described in detail. In the following description, signals which are necessary in maintaining a radio channel will be abbreviated as necessary signals for short.

Figure 1:
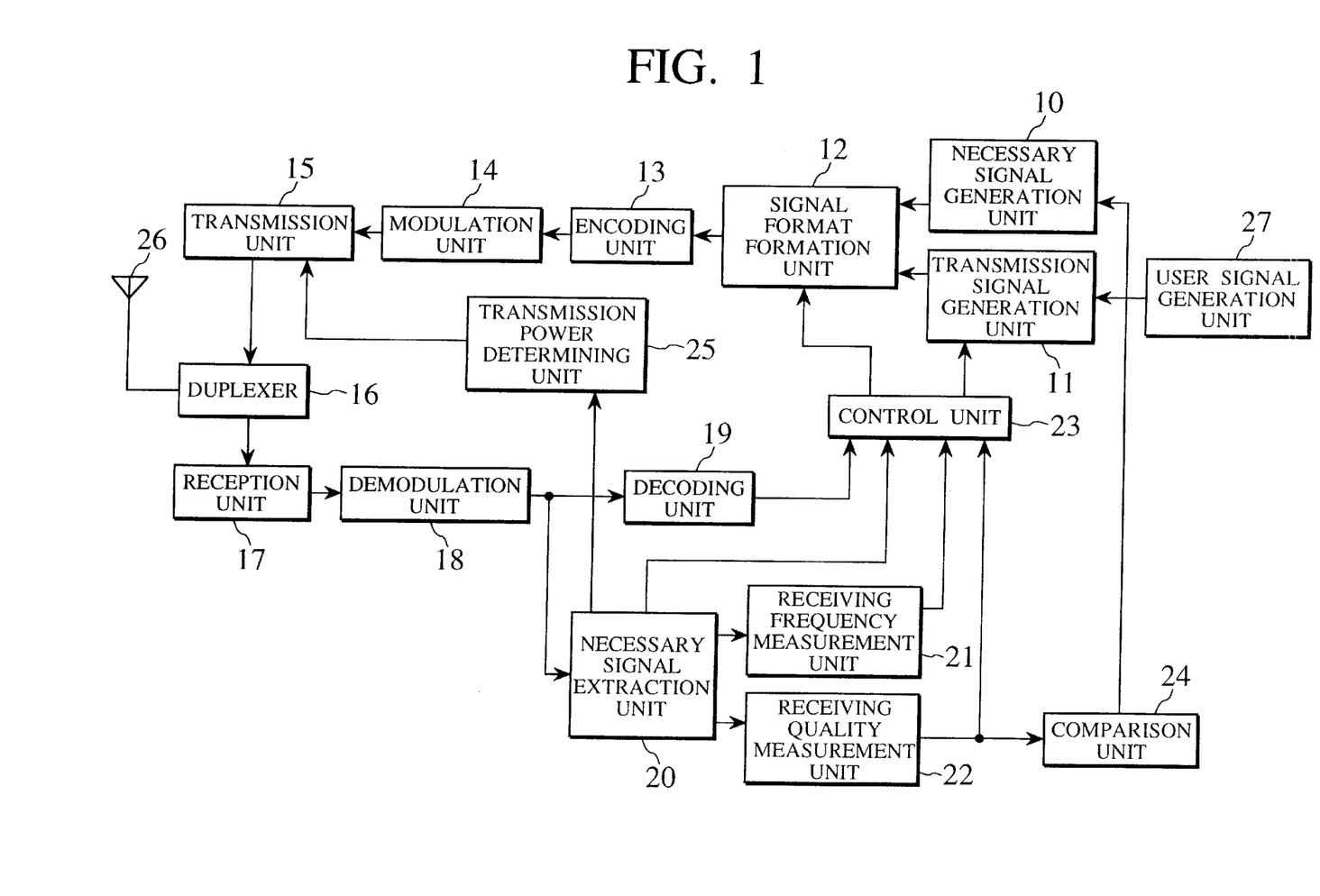
FIG. 1 is a block diagram showing an exemplary configuration of a signal transmission apparatus for realizing a signal transmission method according to the present invention.

First, FIG. 1 shows an exemplary configuration of a signal transmission apparatus for a mobile station or a base station in order to realize a signal transmission method in a CDMA mobile communication system according to the present invention. In realizing the signal transmission method of the present invention, each of the base station and the mobile station can use the signal transmission apparatus in the same configuration as shown in FIG. 1.

The signal transmission apparatus of FIG. 1 comprises: a necessary signal generation unit 10 for generating necessary signals; a transmission signal generation unit 11 for generating transmission signals to be transmitted through a radio channel, which are formed by control signals given from a control unit 23 or user signals given from a user signal generation unit 27; a signal format formation unit 12 for receiving the necessary signals and the transmission signals from the necessary signal generation unit 10 and the transmission signal generation unit 11 respectively, and forming a signal format for the radio channel transmission signals according to the presence/absence of the transmission signals; an encoding unit 13 for generating encoded signals by encoding the signal format formed by the signal format of the radio channel; a modulation unit 14 for generating spread signals by modulating and spreading the encoded signals; a transmission unit 15 for generating radio channel transmission signals from the spread signals, by carrying out a processing such as a D/A conversion and a frequency conversion as well as a prescribed transmission ON/OFF control and an amplification for realizing a transmission power specified from a transmission power determining unit 25; a duplexer 16 for selectively distributing the radio channel transmission signals and received signals; and an antenna 26 connected with the duplexer 26.

The signal transmission apparatus of FIG. 1 further comprises: a reception unit 17 for carrying out a processing such as an amplification, a frequency conversion, and an A/D conversion on the received signals; a demodulation unit 18 for generating demodulated signals by despreading and demodulating the received signals given from the reception unit 17; a decoding unit 19 for decoding the transmission signals contained in the demodulated signals and supplying the decoded transmission signals to the control unit 23; a necessary signal extraction unit 20 for extracting the necessary signals from the demodulated signals; a receiving frequency measurement unit 21 for measuring a receiving frequency of the extracted necessary signals; a receiving quality measurement unit 22 for measuring a receiving quality of the extracted necessary signals; a control unit 23 for generating the control signals from which the transmission signals are to be generated, while carrying out an overall control of the signal transmission apparatus; a comparison unit 24 for comparing the measured receiving quality of the necessary signals with a prescribed quality so as to judge whether the measured receiving quality is higher than a prescribed quality or not, for the purpose of a transmission power control; a transmission power determining unit 25 for determining the transmission power according to a transmission power control information specified from a communicating station which is contained in the extracted necessary signals, and a user signal generation unit 27 for generating the user signals.

The user signal generation unit 27 contains a microphone or an interface to an external terminal in a case of using the signal transmission apparatus of FIG. 1 for the mobile station, or an interface to a wire transmission line from an upper level station in a case of using the signal transmission apparatus of FIG. 1 for the base station.

Next, with reference to FIG. 2, the first embodiment of a signal transmission method in a CDMA mobile communication system according to the present invention will be described in detail.

Figure 2:
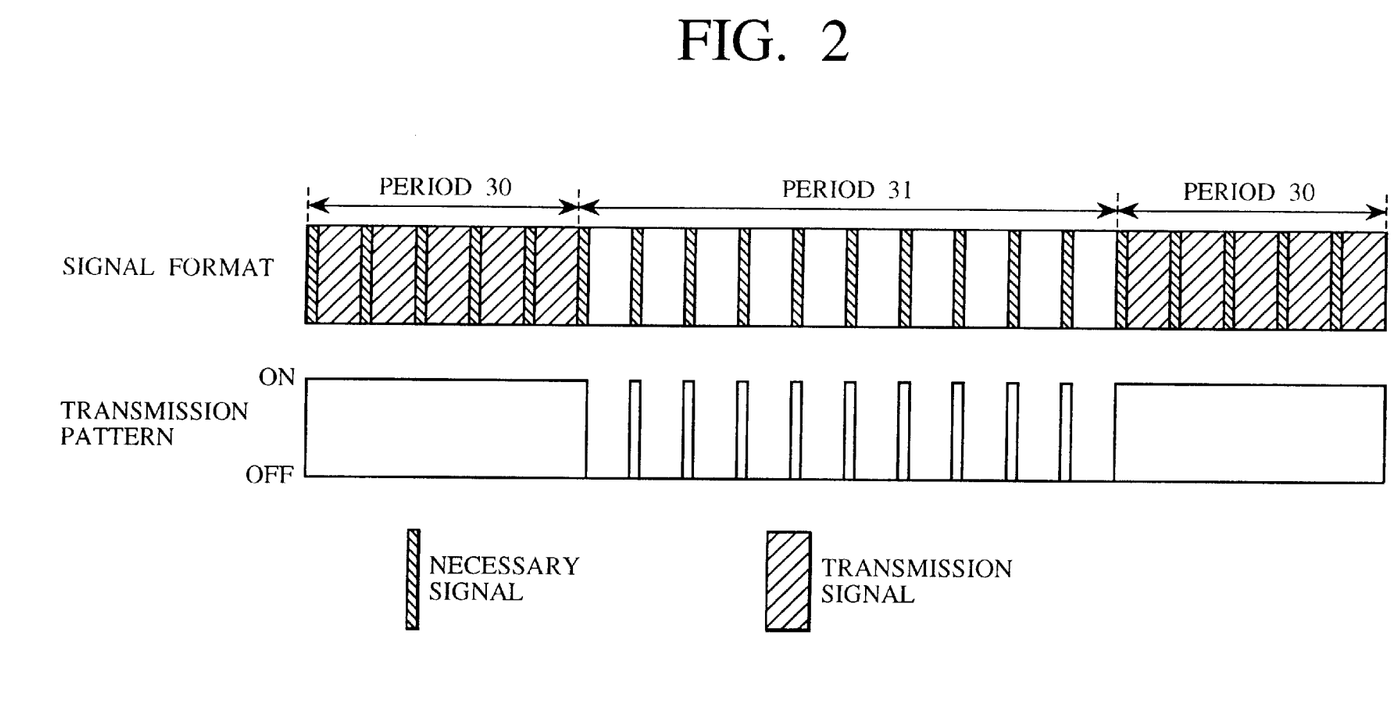
FIG. 2 is a diagram showing exemplary signal format and corresponding transmission pattern for the radio channel transmission signals in the first embodiment of a signal transmission method according to the present invention.

FIG. 2 shows an exemplary signal format and corresponding transmission pattern for the radio channel transmission signals in this first embodiment.

In this case, the necessary signal generation unit 10 constantly generates the necessary signals at the maximum frequency, and supplies the generated necessary signals to the signal format formation unit 12. Then, when the transmission signals are supplied from the transmission signal generation unit 11, the signal format formation unit 12 forms the signal format by combining the necessary signals in the maximum frequency as supplied from the necessary signal generation unit 10 with the transmission signals as supplied from the transmission signal generation unit 11 (the period 30).

On the other hand, when there is no transmission signal to be transmitted through the radio channel so that no transmission signal is supplied from the transmission signal generation unit 11, the signal format formation unit 12 forms the signal format by using only the necessary signals in the maximum frequency as supplied from the necessary signal generation unit 10 while leaving portions for placing transmission signals empty (the period 31).

The signal format formed by the signal format formation unit 12 is then encoded, modulated, and spread at the encoding unit 13 and the modulation unit 14, and the obtained spread signals are supplied to the transmission unit 15. At the transmission unit 15, the processing such as a D/A conversion, a frequency conversion, and an amplification are carried out with respect to the supplied spread signals, while carrying out a prescribed transmission ON/OFF control. In this transmission ON/OFF control, the transmission is set ON at portions where the signals exist in the signal format, that is, the necessary signal portions and the transmission signal portions, while the transmission is set OFF at the empty portions. FIG. 2 shows the transmission pattern which indicates the transmission ON/OFF timings at the transmission unit 15 in correspondence to the signal format.

As shown in FIG. 2, in this first embodiment, when there is no transmission signal, the transmission is set OFF at portions for placing transmission signals so that an unnecessary radio channel transmission is eliminated, and therefore it is possible to prevent an unnecessary increase of an amount of interference power and thereby prevent an unnecessary decrease of a system capacity. In addition, the necessary signals are transmitted regularly so that it is possible to maintain a good transmission quality by maintaining the radio channel even during those periods at which there is no transmission signal to be transmitted.

Next, with reference to FIG. 3, the second embodiment of a signal transmission method in a CDMA mobile communication system according to the present invention will be described in detail.

Figure 3:
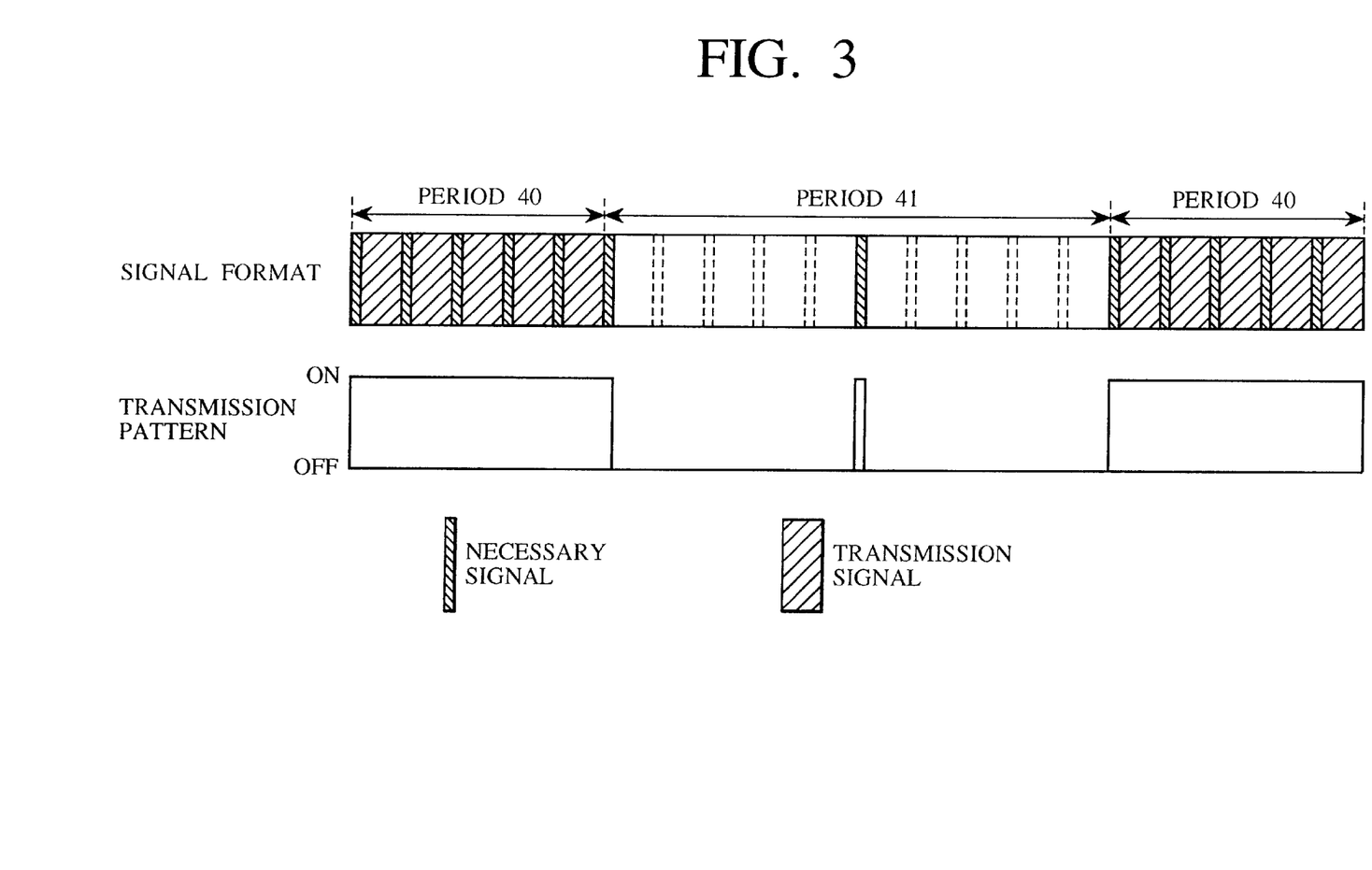
FIG. 3 is a diagram showing exemplary signal format and corresponding transmission pattern for the radio channel transmission signals in the second embodiment of a signal transmission method according to the present invention.

FIG. 3 shows exemplary signal format and corresponding transmission pattern for the radio channel transmission signals in this second embodiment.

In this case, the necessary signal generation unit 10 constantly generates the necessary signals at the maximum frequency, and supplies the generated necessary signals to the signal format formation unit 12. Then, when the transmission signals are supplied from the transmission signal generation unit 11, the signal format formation unit 12 forms the signal format by combining the necessary signals in the maximum frequency as supplied from the necessary signal generation unit 10 with the transmission signals as supplied from the transmission signal generation unit 11 (the period 40).

On the other hand, when there is no transmission signal to be transmitted through the radio channel so that no transmission signal is supplied from the transmission signal generation unit 11, the signal format formation unit 12 forms the signal format by thinning a prescribed number of necessary signals from the necessary signals in the maximum frequency as supplied from the necessary signal generation unit 10 and using only the remaining necessary signals after the thinning, while leaving portions for placing transmission signals and thinned necessary signal portions empty (the period 41).

FIG. 3 depicts an exemplary case of thinning four necessary signals from every five necessary signals, and shows the transmission pattern which indicates the transmission ON/OFF timings at the transmission unit 15 in correspondence to the signal format.

As shown in FIG. 3, in this second embodiment, when there is no transmission signal, the necessary signals are thinned in order to lower their transmission frequency, so that an unnecessary radio channel transmission is further eliminated compared with the first embodiment of FIG. 2, and therefore it is also possible to prevent an unnecessary increase of an amount of interference power and thereby prevent an unnecessary decrease of a system capacity. Note here that it is meaningless to maintain a good radio channel transmission quality during those periods at which there is no transmission signal. For this reason, in this second embodiment, an amount of interference power is further reduced by lowering the transmission frequency of the necessary signals while tolerating a degradation of the transmission quality during those periods at which there is no transmission signal. In addition, a transmission of the necessary signals is continued so that it is possible to maintain the radio channel without causing an out-of-synchronization state at a receiving side.

Next, with reference to FIG. 4, the third embodiment of a signal transmission method in a CDMA mobile communication system according to the present invention will be described in detail.

Figure 4:
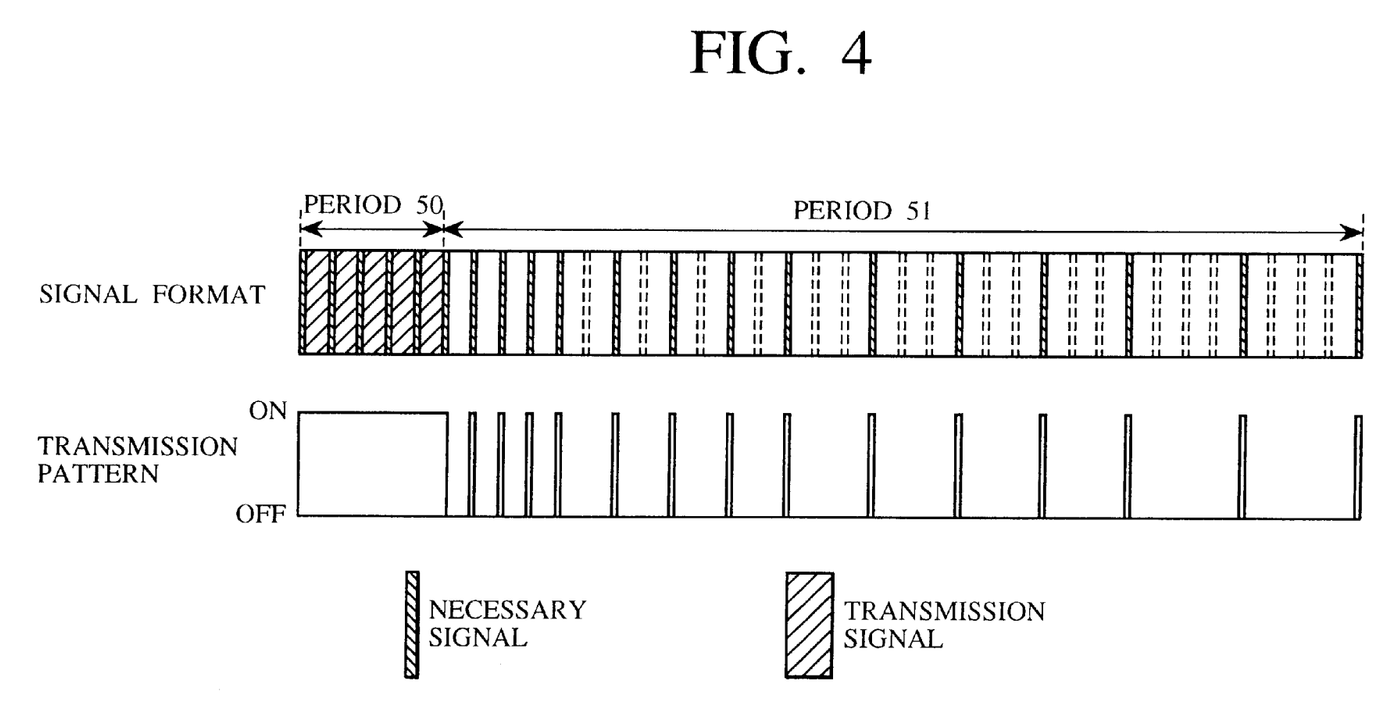
FIG. 4 is a diagram showing exemplary signal format and corresponding transmission pattern for the radio channel transmission signals in the third embodiment of a signal transmission method according to the present invention.

FIG. 4 shows exemplary signal format and corresponding transmission pattern for the radio channel transmission signals in this third embodiment.

In this case, the necessary signal generation unit 10 constantly generates the necessary signals at the maximum frequency, and supplies the generated necessary signals to the signal format formation unit 12. Then, when the transmission signals are supplied from the transmission signal generation unit 11, the signal format formation unit 12 forms the signal format by combining the necessary signals in the maximum frequency as supplied from the necessary signal generation unit 10 with the transmission signals as supplied from the transmission signal generation unit 11 (the period 50).

Thereafter, when there is no transmission signal to be transmitted through the radio channel so that no transmission signal is supplied from the transmission signal generation unit 11, the signal format formation unit 12 forms the signal format by thinning a prescribed number of necessary signals from the necessary signals in the maximum frequency as supplied from the necessary signal generation unit 10 and using only the remaining necessary signals after the thinning. Here, a prescribed number of necessary signals to be thinned is gradually increased as time elapses, starting from a timing immediately after the completion of the immediately previous transmission signal transmission. In this manner, the transmission frequency of the necessary signal portions is gradually lowered, starting from a timing immediately after the completion of the immediately previous transmission signal transmission. Here, portions for placing transmission signals and thinned necessary signal portions are left empty (the period 51).

FIG. 4 depicts an exemplary case of gradually increasing a number of necessary signals to be thinned in a sequence of 0→1→2→3 so as to sequentially lower the transmission frequency of the necessary signals, and shows the transmission pattern which indicates the transmission ON/OFF timings at the transmission unit 15 in correspondence to the signal format.

As shown in FIG. 4, in this third embodiment, when there is no transmission signal to be transmitted next after the completion of the immediately previous transmission signal transmission, the transmission frequency of the necessary signals is gradually lowered along time starting from a timing immediately after the completion of the immediately previous transmission signal transmission. In this manner, when the next transmission signal occurs shortly after the completion of the immediately previous transmission signal transmission, the transmission frequency of the necessary signals is still not lowered very much at that point, so that it is possible to transmit that next transmission signal before the transmission quality of the radio channel is degraded considerably and therefore it is possible to maintain a high transmission success rate for the next transmission signal. On the other hand, when the next transmission signal does not occur for some extended period of time after the completion of the immediately previous transmission signal transmission, it is possible to reduce an amount of interference power by lowering the transmission frequency of the necessary signals.

In the mobile communication system in which more than one transmission signals are to be transmitted, there are cases which require an access to a subscriber memory in a network and cases which do not require such a subscriber memory access. In a case where such a subscriber memory access is required, the time taken by the subscriber memory access is long so that an interval between one transmission signal transmission and a next transmission signal transmission becomes long. In a case where such a subscriber memory access is not required, more than one transmission signals can be transmitted more frequently. Thus there are two extreme cases of a short transmission signal transmission time interval and a long transmission signal transmission time interval for more than one transmission signals.

In this third embodiment, an influence on an amount of interference power due to the necessary signal transmission is small in a case of a short transmission signal transmission time interval, so that the high transmission success rate for the next transmission signal is given a higher priority in such a case. On the other hand, an influence on an amount of interference power due to the necessary signal transmission is large in a case of a long transmission signal transmission time interval, so that the reduction of an amount of interference power by lowering the transmission frequency of the necessary signals is given a higher priority in such a case.

Next, with reference to FIG. 5, the fourth embodiment of a signal transmission method in a CDMA mobile communication system according to the present invention will be described in detail.

Figure 5:
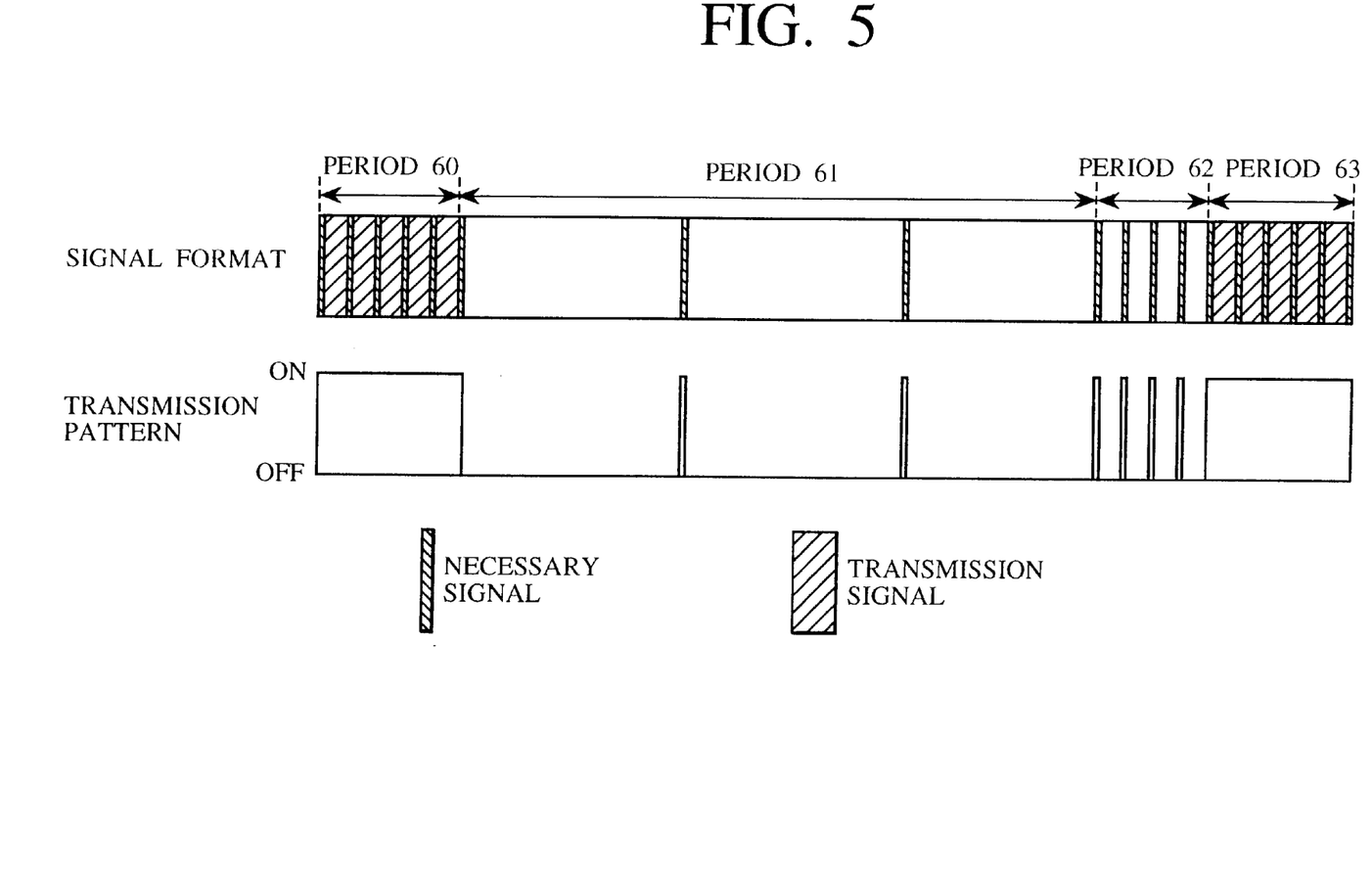
FIG. 5 is a diagram showing exemplary signal format and corresponding transmission pattern for the radio channel transmission signals in the fourth embodiment of a signal transmission method according to the present invention.

FIG. 5 shows exemplary signal format and corresponding transmission pattern for the radio channel transmission signals in this fourth embodiment.

In this case, the necessary signal generation unit 10 constantly generates the necessary signals at the maximum frequency, and supplies the generated necessary signals to the signal format formation unit 12. Then, when the transmission signals are supplied from the transmission signal generation unit 11, the signal format formation unit 12 forms the signal format by combining the necessary signals in the maximum frequency as supplied from the necessary signal generation unit 10 with the transmission signals as supplied from the transmission signal generation unit 11 (the period 60).

On the other hand, when there is no transmission signal to be transmitted through the radio channel so that no transmission signal is supplied from the transmission signal generation unit 11, the signal format formation unit 12 forms the signal format by thinning a prescribed number of necessary signals from the necessary signals in the maximum frequency as supplied from the necessary signal generation unit 10 and using only the remaining necessary signals after the thinning, while leaving portions for placing transmission signals and thinned necessary signal portions empty (the period 61).

Thereafter, when the transmission signals to be transmitted occur again, the signal format formation unit 12 forms the signal format for a prescribed period of time by using only the necessary signals in the maximum frequency as supplied from the necessary signal generation unit 10 (the period 62). Then, the signal format formation unit 12 forms the subsequent signal format by combining the necessary signals in the maximum frequency as supplied from the necessary signal generation unit 10 with the transmission signals as supplied from the transmission signal generation unit 11 (the period 63).

FIG. 5 shows the transmission pattern which indicates the transmission ON/OFF timings at the transmission unit 15 in correspondence to the signal format.

As shown in FIG. 5, in this fifth embodiment, the necessary signals in the maximum frequency are transmitted for a prescribed period of time prior to the transmission signal transmission, so that it is possible to carry out the transmission signal transmission after the transmission quality of the radio channel is sufficiently improved, and therefore it is possible to raise the transmission success rate for the transmission signal transmission.

Next, with reference to FIG. 6 and FIG. 7, the fifth embodiment of a signal transmission method in a CDMA mobile communication system according to the present invention will be described in detail.

In this fifth embodiment, the receiving quality measurement unit 22 measures the receiving quality of the received necessary signals, and notifies the measurement result to the control unit 23. Here, the measurement result to be notified to the control unit 23 can be the measured receiving quality for one necessary signal, or an average value of the measured receiving qualities for a prescribed number of necessary signals, or else an average value of the measured receiving qualities for all the necessary signals received within a prescribed period of time.

Then, when the receiving quality notified from the receiving quality measurement unit 22 becomes lower than a prescribed receiving quality, or when a state in which the notified receiving quality becomes lower than the prescribed receiving quality occurs consecutively for a prescribed number of times, or else when a state in which the notified receiving quality becomes lower than the prescribed receiving quality continues for a prescribed period of time, the control unit 23 commands the signal format formation unit 12 to set the transmission frequency of the necessary signals at the maximum level. In response, the signal format formation unit 12 forms the signal format by using the necessary signals in the maximum frequency, regardless of the presence or absence of the transmission signals to be transmitted and the transmission frequency of the necessary signals at a timing of receiving that command.

In addition, when the receiving quality notified from the receiving quality measurement unit 22 becomes higher than the prescribed receiving quality, or when a state in which the notified receiving quality becomes higher than the prescribed receiving quality occurs consecutively for a prescribed number of times, or else when a state in which the notified receiving quality becomes higher than the prescribed receiving quality continues for a prescribed period of time, the control unit 23 commands the signal format formation unit 12 to set the transmission frequency of the necessary signals lower than the maximum level. In response, when there is no transmission signal to be transmitted at a timing of receiving that command, the signal format formation unit 12 forms the signal format by thinning a prescribed number of necessary signals from the necessary signals in the maximum frequency as supplied from the necessary signal generation unit 10 and using only the remaining necessary signals after the thinning.

For the receiving quality to be measured by the receiving quality measurement unit 22 in this fifth embodiment, it is possible to use a receiving SIR (Signal to Interference Ratio) which is a ratio of the desired signal receiving level and the interference receiving level, or a bit error rate, for example.

Figure 6:
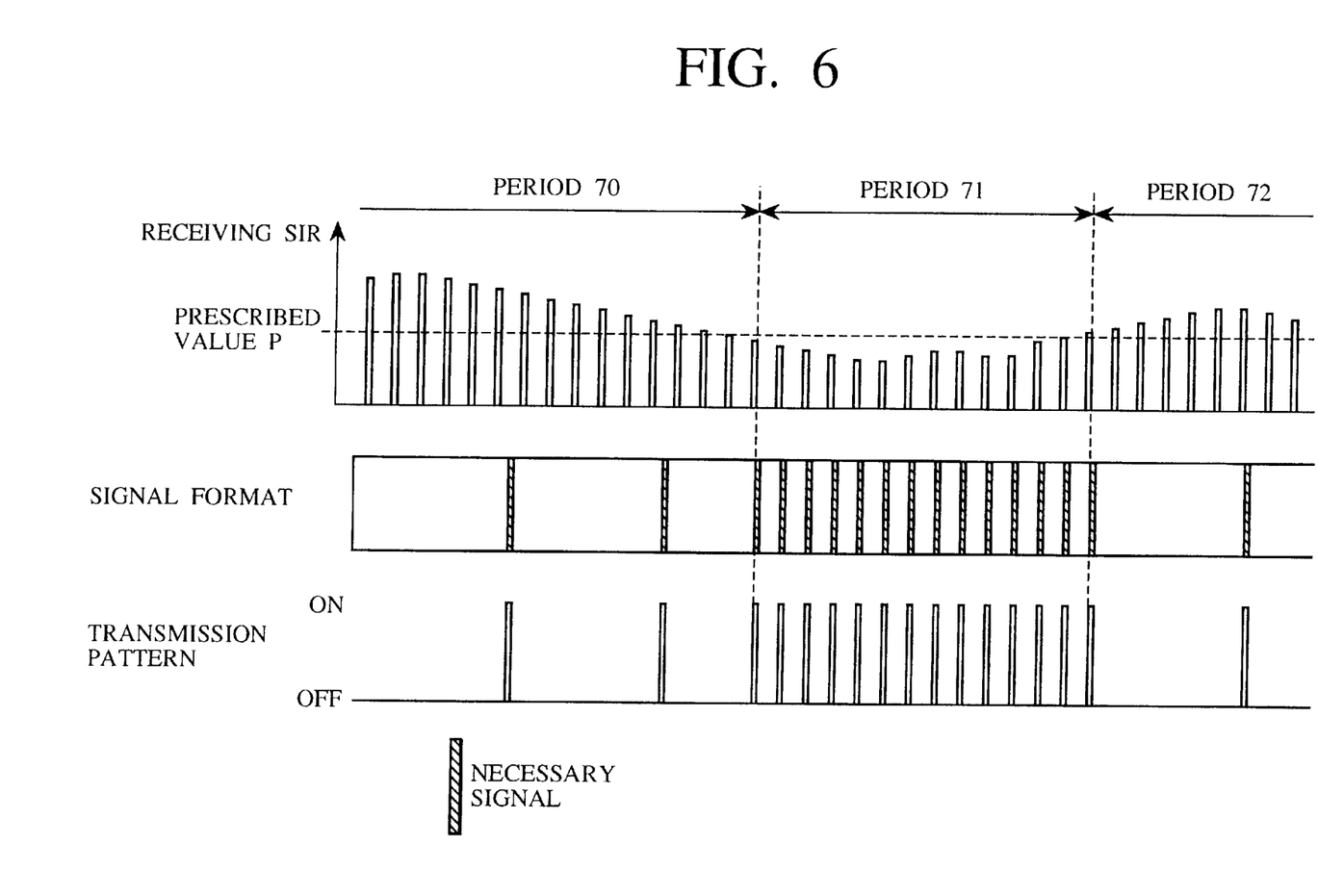
FIG. 6 is a diagram showing an exemplary variation of the receiving quality of the necessary signals along with exemplary signal format and corresponding transmission pattern for the radio channel transmission signals in the fifth embodiment of a signal transmission method according to the present invention, for one exemplary case.

FIG. 6 shows an exemplary variation of the receiving quality of the necessary signals along with exemplary signal format and corresponding transmission pattern for the radio channel transmission signals in this fifth embodiment, for an exemplary case of using the receiving SIR as the receiving quality.

In this exemplary case, the transmission frequency of the necessary signals is controlled to be at the maximum level at a timing where the receiving SIR becomes lower than a prescribed value P, while the transmission frequency of the necessary signals is controlled to be lower than the maximum level at a timing where the receiving SIR becomes higher than the prescribed value P. Accordingly, the transmission frequency of the necessary signals becomes lower than the maximum frequency during those periods (the periods 70 and 72) where the receiving SIR is higher than the prescribed value P while the transmission frequency of the necessary signals becomes the maximum frequency during those periods (the period 71) where the receiving SIR is lower than the prescribed value P.

Note that the same prescribed value P is used in FIG. 6 for determining a timing to raise the transmission frequency of the necessary signals (at a border between the periods 71 and 72) and for determining a timing to lower the transmission frequency of the necessary signals (at a border between the periods 71 and 72), but it is also possible to use different prescribed values for determining these two timings.

Note also that FIG. 6 is directed to an exemplary case of using one prescribed value with respect to two transmission frequencies, but it is also possible to use more than one prescribed values with respect to more than two transmission frequencies so as to realize a more minute control. In such a case, the transmission frequency of the necessary signals is to be raised higher for the lower measured receiving quality.

Figure 7:
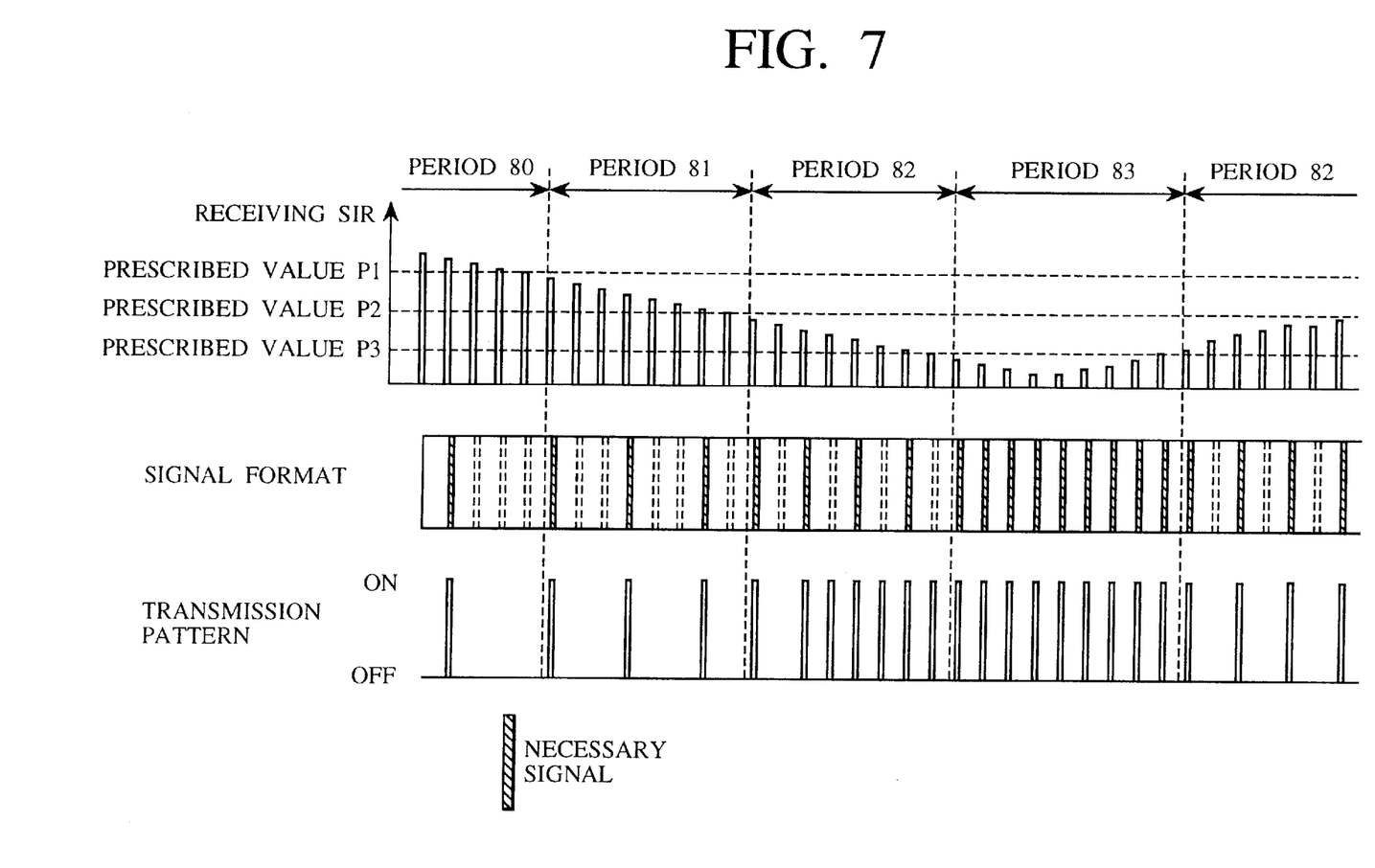
FIG. 7 is a diagram showing an exemplary variation of the receiving quality of the necessary signals along with exemplary signal format and corresponding transmission pattern for the radio channel transmission signals in the fifth embodiment of a signal transmission method according to the present invention, for another exemplary case.

FIG. 7 shows an exemplary variation of the receiving quality of the necessary signals along with exemplary signal format and corresponding transmission pattern for the radio channel transmission signals in this fifth embodiment, for an exemplary case of using three prescribed values with respect to four transmission frequencies.

In this exemplary case of FIG. 7, three prescribed values P1, P2 and P3 are set as the receiving SIR values in a descending order (an order of higher to lower receiving quality), to define four types of period including a period at which the receiving SIR is higher than P1 (the period 80), a period at which the receiving SIR is higher than P2 but lower than P1 (the period 81), a period at which the receiving SIR is higher than P3 but lower than P2 (the period 82), and a period at which the receiving SIR is lower than P3 (the period 83). Then, in correspondence to these four types of period, a number of necessary signals to be thinned from the necessary signals in the maximum frequency is set to be 3, 2, 1 and 0, respectively, so as to vary the transmission frequency of the necessary signals.

In the radio channels used in the mobile communication, an uplink channel (from a mobile station to a base station) and a downlink channel (from a base station to a mobile station) have highly correlative transmission qualities, so that when the receiving quality is low at one station, the receiving quality is likely to be low at the other station as well.

For this reason, in this fifth embodiment, it is assumed that the receiving quality at the correspondent station is likely to be low when the receiving quality of the necessary signals at the own station is low, and the transmission frequency of the necessary signals is raised so as to improve the transmission quality of the radio channel transmitted from the own station and thereby improve the receiving quality at the correspondent station. Conversely, it is assumed that the receiving quality at the correspondent station is likely to be high when the receiving quality of the necessary signals at the own station is high, and the transmission frequency of the necessary signals is lowered so as to prevent an unnecessary increase of an amount of interference power and thereby prevent an unnecessary decrease of a system capacity.

Next, with reference to FIG. 8, the sixth embodiment of a signal transmission method in a CDMA mobile communication system according to the present invention will be described in detail.

In this sixth embodiment, the necessary signal extraction unit 20 extracts the received necessary signals, and when the necessary signals are not detected over a prescribed period of time due to the low receiving quality, the necessary signal extraction unit 20 notifies this fact to the control unit 23. Then, when this notice is received, the control unit 23 commands the signal format formation unit 12 to set the transmission frequency of the necessary signals at the maximum level. In response, the signal format formation unit 12 forms the signal format by using the necessary signals in the maximum frequency, regardless of the presence or absence of the transmission signals to be transmitted and the transmission frequency of the necessary signals at a timing of receiving that command.

In addition, when the necessary signals are detected over the prescribed period of time again due to the improved receiving quality after failing to detect the necessary signals over the prescribed period of time, the necessary signal extraction unit 20 notifies this fact to the control unit 23. Then, when this notice is received, the control unit 23 commands the signal format formation unit 12 to set the transmission frequency of the necessary signals lower than the maximum level. In response, when there is no transmission signal to be transmitted at a timing of receiving that command, the signal format formation unit 12 forms the signal format by thinning the necessary signals so as to realize the transmission frequency lower than the maximum level as specified from the control unit 23.

Figure 8:
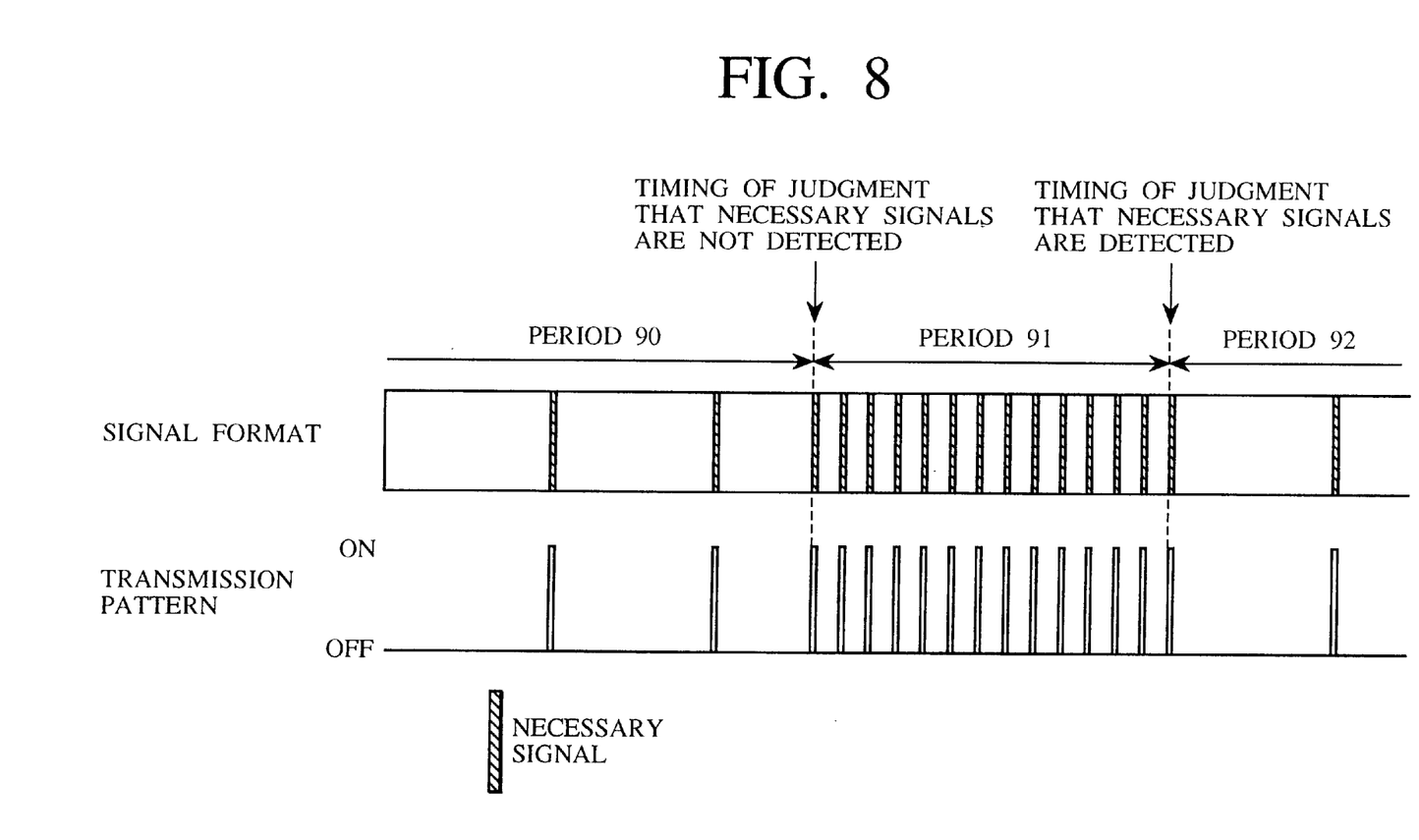
FIG. 8 is a diagram showing exemplary signal format and corresponding transmission pattern for the radio channel transmission signals in the sixth embodiment of a signal transmission method according to the present invention.

FIG. 8 shows exemplary signal format and corresponding transmission pattern for the radio channel transmission signals in this sixth embodiment.

In this case, the transmission frequency of the necessary signals is controlled to be at the maximum level during a period since a timing of the judgement that the received necessary signals are not detected until a timing of the judgement that the received necessary signals are detected (the period 91). Also, the transmission frequency of the necessary signals is controlled to be lower than the maximum level during a period before the timing of the judgement that the received necessary signals are not detected (the period 90) and a period after the timing of the judgement that the received necessary signals are detected after failing to detect the received necessary signals.

As already mentioned in relation to the fifth embodiment described above, in the radio channels used in the mobile communication, an uplink channel and a downlink channel have highly correlative transmission qualities, so that when the receiving quality is as low as not being able to detect the necessary signals at one station, the receiving quality is likely to be just as low at the other station as well.

For this reason, in this sixth embodiment, it is assumed that the receiving quality at the correspondent station is likely to be low when the necessary signals cannot be detected at the own station, and the transmission frequency of the necessary signals is raised so as to improve the transmission quality of the radio channel transmitted from the own station and thereby improve the receiving quality at the correspondent station. Conversely, it is assumed that the receiving quality at the correspondent station is likely to be high when the necessary signals can be detected at the own station, and the transmission frequency of the necessary signals is lowered so as to prevent an unnecessary increase of an amount of interference power and thereby prevent an unnecessary decrease of a system capacity.

Next, the seventh embodiment of a signal transmission method in a CDMA mobile communication system according to the present invention will be described in detail.

In this seventh embodiment, the necessary signal extraction unit 20 extracts the received necessary signals, and the receiving frequency measurement unit 21 measures the receiving frequency of the received necessary signals and notifies the measurement result to the control unit 23 at a suitable timing. Then, the control unit 23 specifies a transmission frequency which is identical to the measured receiving frequency to the signal format formation unit 12, as the transmission frequency of the necessary signals to be transmitted from the own station. Then, when there is no transmission signal to be transmitted, the signal format formation unit 12 forms the signal format by thinning the necessary signals so as to realize the transmission frequency as specified from the control unit 23.

In the fifth and sixth embodiments described above, the transmission frequency of the necessary signals is varied according to the receiving quality or the detection/non-detection of the necessary signals. However, such a transmission frequency control only has an effect of controlling the receiving quality at the correspondent station, and there is no effect for improving the receiving quality at the own station. In this regard, in this seventh embodiment, the transmission frequency of the necessary signals to be transmitted from the own station is raised when the receiving quality at the own station is low, and then the correspondent station raises the transmission frequency of the necessary signals to be transmitted from the correspondent station in accordance with the raised receiving frequency of the necessary signals transmitted from the own station, so that the receiving frequency of the necessary signals at the own station is also subsequently raised and therefore the receiving quality at the own station can be improved.

Thus by combining this seventh embodiment with either the fifth or the sixth embodiment described above, it is possible to improve the receiving quality not only at the correspondent station but also at the own station.

Moreover, there is also a case in which the receiving quality at the receiving side cannot be improved by merely raising the transmission frequency of the necessary signals in one direction but the receiving quality at the receiving side can be improved by raising the transmission frequencies of the necessary signals in both directions, as in a case of using the transmission power control which will be described below. Even in such a case, this seventh embodiment is effective because the transmission frequencies of the necessary signals can be raised in both directions automatically.

Next, the eighth embodiment of a signal transmission method in a CDMA mobile communication system according to the present invention will be described in detail.

In this eighth embodiment, the necessary signal generation unit 10 includes pilot signals to be used in carrying out the coherent detection with interpolation at a receiving side. The detail regarding the pilot signal and the coherent detection with interpolation can be found in PCT application International Publication No. WO95/35615.

In short, the coherent detection with interpolation is a method in which known pilot signals are inserted into the radio channel at a prescribed frequency so that a receiving side can estimate a propagation function of the radio section by receiving the known pilot signals and carry out the coherent detection based on the estimated propagation function with respect to the transmission signals placed between two pilot signals.

Here, when there is no transmission signal to be transmitted, there is no need to estimate the propagation function, so that the transmission of the pilot signals at a high transmission frequency causes an unnecessary increase of an amount of interference power. For this reason, when there is no transmission signal to be transmitted, an amount of interference power is reduced by lowering the transmission frequency of the pilot signals in this eighth embodiment.

Next, the ninth embodiment of a signal transmission method in a CDMA mobile communication system according to the present invention will be described in detail.

In this ninth embodiment, the necessary signal generation unit 10 includes a synchronization information which is necessary in maintaining the synchronization for signal reception at a receiving side. In order to receive the radio channel at the receiving side, it is necessary to establish the synchronization with the radio channel. Here, the synchronization timing changes as a mobile station moves, so that it is necessary for the receiving side to follow the changing synchronization timing, and in order to follow the synchronization timing, it is necessary for the radio channel to include the synchronization information having a known bit pattern.

When a high transmission frequency is used for the synchronization information, the synchronization for signal reception can be maintained stably at the receiving side, whereas when a low transmission frequency is used for the synchronization information, the receiving quality of the radio channel can be degraded as it becomes easier for the receiving side to be in an out-of-synchronization state. However, in view of the fact that the frequent transmission of the synchronization information increases an amount of interference power, it is preferable to lower the transmission frequency of the necessary signals by tolerating the degradation of the receiving quality when there is no transmission signal to be transmitted. In this regard, this ninth embodiment is effective since the transmission frequency of the synchronization information is lowered when there is no transmission signal to be transmitted in this ninth embodiment.

Next, the tenth embodiment of a signal transmission method in a CDMA mobile communication system according to the present invention will be described in detail.

In this tenth embodiment, the necessary signal generation unit 10 includes an order number which is necessary in carrying out an order control at a time of signal transmission or signal reception.

An exemplary case which requires the order control is a case of the combining in the soft handover which is a characteristic feature of the CDMA mobile communication system. At a time of the soft handover, a mobile station carries out communications with a plurality of base stations. In an upward direction, for example, the radio channel transmitted from a single mobile station is received at a plurality of base stations, and the received signals of these plurality of base stations are combined at an upper level station of the base stations so as to produce a high quality received signal. In this combining, there is no guarantee that a plurality of received signals from a plurality of base stations reach the upper level station simultaneously, so that there is a need to carry out the order control in order to ascertain corresponding received signals to be combined among a plurality of received signals. To this end, the mobile station transmits a radio frame to which the order number is attached, and the upper level station combines a plurality of frames which have the identical order number among a plurality of received signals from a plurality of base stations. In this manner, it is possible to carry out a highly reliable combining processing.

Now, it suffices to carry out the order control only when there is a transmission signal to be transmitted, and the order control is unnecessary when there is no transmission signal to be transmitted. For this reason, in this tenth embodiment, the transmission frequency of the order number to be used in the order control is lowered when there is no transmission signal to be transmitted so that it becomes possible to prevent an unnecessary increase of an amount of interference power.

Next, the eleventh embodiment of a signal transmission method in a CDMA mobile communication system according to the present invention will be described in detail.

In this eleventh embodiment, the necessary signal generation unit 10 includes a transmission power control information which is necessary in carrying out a transmission power control. The detail regarding the transmission power control method can be found in U.S. Pat. No. 5,056,109.

According to this transmission power control method, the comparison unit 24 compares the receiving quality of the necessary signals measured by the receiving quality measurement unit 22 with a prescribed quality, and notifies the necessary signal generation unit 10 as to whether the measured receiving quality is lower than the prescribed quality or higher than the prescribed quality. In response, the necessary signal generation unit 10 sets the transmission power control information to be contained in the necessary signals as a bit indicating a raising of the transmission power by a prescribed value when the measured receiving quality is lower than the prescribed quality, or as a bit indicating a lowering of the transmission power by a prescribed value when the measured receiving quality is higher than the prescribed quality.

Then, the transmission power determining unit 25 of the correspondent station receives the necessary signals from the necessary signal extraction unit 20, and determines the transmission power as a value which is higher than a current value by a prescribed value when the transmission power control information contained in the necessary signals is a bit indicating a raising of the transmission power by a prescribed value, or as a value which is lower than a current value by a prescribed value when the transmission power control information contained in the necessary signals is a bit indicating a lowering of the transmission power by a prescribed value. The transmission power determining unit 25 then notifies the determined transmission power value to the transmission unit 15, and in response, the transmission unit 15 generates the radio channel transmission signals by carrying out an appropriate amplification for realizing the notified transmission power value.

By the above operation, it is possible to control the transmission power so that the receiving quality follows the prescribed quality, and therefore it is possible to suppress an amount of interference power by reducing an unnecessary transmission power while satisfying the prescribed quality. By carrying out the comparison of the measured receiving quality with the prescribed quality and the transmission of the transmission power control information at a higher frequency, an error of the receiving quality with respect to the prescribed quality can be made smaller so that the degradation of the quality or an unnecessary increase of an amount of interference power can be prevented.

Now, when there is no transmission signal to be transmitted, even a large error of the receiving quality with respect to the prescribed quality has a small influence on the degradation of the quality or the increase of an amount of interference power. For this reason, in this eleventh embodiment, the transmission frequency of the transmission power control information is lowered when there is no transmission to be transmitted so that it becomes possible to prevent an unnecessary increase of an amount of interference power.

It is to be noted that the above described signal transmission method according to the present invention is effective for the transmission signals which are transmitted intermittently. Namely, the control signal is not transmitted while the control signal processing is carried out at a mobile station or a base station so that the control signal is an intermittently transmitted signal and therefore the present invention can be effectively applied to the transmission of the control signal. Also, the user signal to be transmitted by the packet transmission is also an intermittently transmitted signal and therefore the present invention can be effectively applied to the transmission of the user signal. For instance, the present invention can be applied to the transmission of a user information using an IP packet as used in the Internet which is rapidly spreading in recent years. Here, the IP packet is transmitted only when some operation is made at a terminal by a user, so that it is an intermittently transmitted signal. Apart from this transmission using the IP packet, the transmission of the user information using the other packet protocol such as X.25 can also be the intermittent transmission, so that the present invention is effectively applicable to the packet transmission in general.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of signal transmission at a base station or a mobile station in a CDMA mobile communication system in which the base station and the mobile station carry out communications according to a CDMA scheme by transmitting transmission signals which are formed by control signals or user signals through a radio channel set up between the mobile station and the base station, the method comprising the steps of:

transmitting radio channel transmission signals through the radio channel by turning transmission output ON for both first signal portions of the radio channel containing the transmission signals and second signal portions of the radio channel containing necessary signals which are necessary in maintaining the radio channel when the transmission signals to be transmitted exist; and controlling the transmitting step so that transmission output for the first signal portions is turned OFF and only transmission output for the second signal portion remains ON, when there is no transmission signal to be transmitted.

2. The method of claim 1, wherein the controlling step controls the transmitting step to form the radio channel transmission signals by combining the transmission signals and the necessary signals when the transmission signals to be transmitted exist, or by using only the necessary signals when there is no transmission signal to be transmitted.

3. The method of claim 1, wherein the controlling step controls the transmitting step to transmit the second signal portions at a lower transmission frequency when there is no transmission signal to be transmitted, and at a higher transmission frequency when the transmission signals to be transmitted exist.

4. The method of claim 1, wherein the controlling step controls the transmitting step to transmit the second signal portions at a transmission frequency which is gradually lowered starting from a timing immediately after a completion of an immediately previous transmission signal transmission, while there is no transmission signal to be transmitted after the completion of the immediately previous transmission signal transmission.

5. The method of claim 1, wherein the controlling step controls the transmitting step to transmit the second signal portions at a transmission frequency lower than a maximum transmission frequency when there is no transmission signal to be transmitted, and transmit the first signal portions for next transmission signals after only the second signal portions are transmitted at the maximum transmission frequency for a prescribed period of time.

6. The method of claim 1, further comprising the step of:
measuring a receiving quality of received second signal portions which are transmitted from a correspondent station;
wherein the controlling step controls the transmitting step to transmit the second signal portions at a higher transmission frequency when the receiving quality measured by the measuring step is lower.

7. The method of claim 6, wherein the measuring step measures a receiving SIR of the received second signal portions as the receiving quality.

8. The method of claim 6, wherein the measuring step measures a bit error rate of the received second signal portions as the receiving quality.

9. The method of claim 1, wherein the controlling step controls the transmitting step to transmit the second signal portions at a maximum transmission frequency, when received second signal portions which are transmitted from a correspondent station are not detected over a prescribed period of time.

10. The method of claim 1, further comprising the step of:
measuring a receiving frequency of received second signal portions which are transmitted from a correspondent station;
wherein the controlling step controls the transmitting step to transmit the second signal portions at a transmission frequency which is identical to the receiving frequency measured by the measuring step.

11. The method of claim 1, wherein the controlling step controls the transmitting step to form the radio channel transmission signals by placing the necessary signals intermittently and periodically and thinning the necessary signals and not transmit the second signal portions for thinned necessary signals, so that a transmission frequency of the second signal portions is varied by changing a number of the thinned necessary signals.

12. The method of claim 1, wherein the transmitting step forms the radio channel transmission signals by using the necessary signals which contain any one or more of pilot signals which are necessary in carrying out a coherent detection with interpolation, a synchronization information which is necessary in maintaining a synchronization for signal reception at a receiving side, an order number which is necessary in carrying out an order control at a time of signal transmission or signal reception, and a transmission power control information which is necessary in carrying out a transmission power control.

13. An apparatus for signal transmission at a base station or a mobile station in a CDMA mobile communication system in which the base station and the mobile station carry out communications according to a CDMA scheme by transmitting transmission signals which are formed by control signals or user signals through a radio channel set up between the mobile station and the base station, the apparatus comprising
a transmission unit for transmitting radio channel transmission signals through the radio channel by turning transmission output ON for both first signal portions of the radio channel containing the transmission signals and second signal portions of the radio channel containing necessary signals which are necessary in maintaining the radio channel when the transmission signals to be transmitted exist; and
a control unit for controlling a radio channel transmission by the transmission unit so that transmission output for the first signal portions is turned OFF and only transmission output for the second signal portions remains ON, when there is no transmission signal to be transmitted.

14. The apparatus of claim 13, wherein the control unit controls the transmission unit to form the radio channel transmission signals by combining the transmission signals and the necessary signals when the transmission signals to be transmitted exist, or by using only the necessary signals when there is no transmission signal to be transmitted.

15. The apparatus of claim 13, wherein the control unit controls the transmission unit to transmit the second signal portions at a lower transmission frequency when there is no transmission signal to be transmitted, and at a higher transmission frequency when the transmission signals to be transmitted exist.

16. The apparatus of claim 13, wherein the control unit controls the transmission unit to transmit the second signal portions at a transmission frequency which is gradually lowered starting from a timing immediately after a completion of an immediately previous transmission signal transmission, while there is no transmission signal to be transmitted after the completion of the immediately previous transmission signal transmission.

17. The apparatus of claim 13, wherein the control unit controls the transmission unit to transmit the second signal portions at a transmission frequency lower than a maximum transmission frequency when there is no transmission signal to be transmitted, and transmit the first signal portions for next transmission signals after only the second signal portions are transmitted at the maximum transmission frequency for a prescribed period of time.

18. The apparatus of claim 13, further comprising:
a measurement unit for measuring a receiving quality of received second signal portions which are transmitted from a correspondent station;
wherein the control unit controls the transmission unit to transmit the second signal portions at a higher transmission frequency when the receiving quality measured by the measurement unit is lower.

19. The apparatus of claim 18, wherein the measurement unit measures a receiving SIR of the received second signal portions as the receiving quality.

20. The apparatus of claim 18, wherein the measurement unit measures a bit error rate of the received second signal portions as the receiving quality.

21. The apparatus of claim 13, wherein the control unit controls the transmission unit to transmit the second signal portions at a maximum transmission frequency, when received second signal portions which are transmitted from a correspondent station are not detected over a prescribed period of time.

22. The apparatus of claim 13, further comprising:
a measurement unit for measuring a receiving frequency of received second signal portions which are transmitted from a correspondent station;

wherein the control unit controls the transmission unit to transmit the second signal portions at a transmission frequency which is identical to the receiving frequency measured by the measurement unit.

23. The apparatus of claim 13, wherein the control unit controls the transmission unit to form the radio channel transmission signals by placing the necessary signals intermittently and periodically and thinning the necessary signals and not transmit the second signal portions for thinned necessary signals, so that a transmission frequency of the second signal portions is varied by changing a number of the thinned necessary signals.

24. The apparatus of claim 13, wherein the transmission unit forms the radio channel transmission signals by using the necessary signals which contain any one or more of pilot signals which are necessary in carrying out a coherent detection with interpolation, a synchronization information which is necessary in maintaining a synchronization for signal reception at a receiving side, an order number which is necessary in carrying out an order control at a time of signal transmission or signal reception, and a transmission power control information which is necessary in carrying out a transmission power control.

* * * * *